(12) United States Patent
Yoon et al.

(10) Patent No.: US 12,409,707 B2
(45) Date of Patent: Sep. 9, 2025

(54) VEHICULAR AIR CONDITIONING SYSTEM

(71) Applicant: Hanon Systems, Daejeon (KR)

(72) Inventors: Seo Jun Yoon, Daejeon (KR); Sang Ki Lee, Daejeon (KR); Yong Sik Kim, Daejeon (KR); Chang Sun Park, Daejeon (KR); Seung Ho Lee, Daejeon (KR); Cheol Han Jang, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 405 days.

(21) Appl. No.: 17/921,497

(22) PCT Filed: Jun. 24, 2021

(86) PCT No.: PCT/KR2021/007950
§ 371 (c)(1),
(2) Date: Oct. 26, 2022

(87) PCT Pub. No.: WO2022/005103
PCT Pub. Date: Jan. 6, 2022

(65) Prior Publication Data
US 2023/0158862 A1     May 25, 2023

(30) Foreign Application Priority Data

Jun. 30, 2020 (KR) .................. 10-2020-0079747
Jun. 30, 2020 (KR) .................. 10-2020-0079764

(51) Int. Cl.
*B60H 1/26* (2006.01)
(52) U.S. Cl.
CPC ..................................... *B60H 1/26* (2013.01)

(58) Field of Classification Search
CPC ...... B60H 2001/00085; B60H 1/00849; B60H 1/26; B60H 1/00685; B60H 2001/00707; B60H 2001/00721; B60H 2001/00714; B60H 1/3233
USPC ......................................................... 454/143
See application file for complete search history.

(56) References Cited

U.S. PATENT DOCUMENTS

| | | | | |
|---|---|---|---|---|
| 4,604,873 A | * | 8/1986 | Ohashi | B60H 1/0005 62/158 |
| 6,019,163 A | * | 2/2000 | Saida | B60H 1/00678 454/126 |
| 8,002,615 B2 | * | 8/2011 | Jeong | B60H 3/0616 454/156 |
| 2010/0144261 A1 | * | 6/2010 | Barkic | B60H 1/00792 454/75 |

(Continued)

FOREIGN PATENT DOCUMENTS

| | | |
|---|---|---|
| JP | 2004-082800 A | 3/2004 |
| JP | 2019-006160 A | 1/2019 |

(Continued)

*Primary Examiner* — Ko-Wei Lin
(74) *Attorney, Agent, or Firm* — NORTON ROSE FULBRIGHT US LLP

(57) ABSTRACT

A vehicular air conditioning system includes an intake case having an indoor air inlet for introducing an indoor air present in a vehicle interior and an outdoor air inlet for introducing an outdoor air present outside a vehicle, an intake door installed in the intake case to selectively block one of the outdoor air inlet and the indoor air inlet while rotating about a rotation center shaft, and a water blocking part configured to block water flowing into the vehicle interior from the indoor air inlet of the intake case.

19 Claims, 8 Drawing Sheets

(56) References Cited

U.S. PATENT DOCUMENTS

| | | | |
|---|---|---|---|
| 2011/0005720 A1* | 1/2011 | Seto | B60H 1/00064 |
| | | | 165/71 |
| 2011/0009044 A1* | 1/2011 | Seto | B60H 1/00028 |
| | | | 454/143 |
| 2020/0055376 A1* | 2/2020 | Narahara | B60H 1/00528 |
| 2020/0207180 A1* | 7/2020 | Cho | F04D 25/166 |
| 2021/0323375 A1* | 10/2021 | Kim | B60H 1/3228 |

FOREIGN PATENT DOCUMENTS

| | | |
|---|---|---|
| KR | 10-2008-0023909 A | 3/2008 |
| KR | 10-2009-0090038 A | 8/2009 |

\* cited by examiner

PRIOR ART

PRIOR ART

VEHICULAR AIR CONDITIONING SYSTEM

CROSS REFERENCE TO RELATED APPLICATIONS

This application is a national phase under 35 U.S.C. § 371 of International Application No. PCT/KR2021/007950 filed on Jun. 24, 2021, which claims the benefit of priority from Korean Patent Application Nos. 10-2020-0079764 filed on Jun. 30, 2020 and 10-2020-0079747 filed on Jun. 30, 2020. The entire contents of these applications are incorporated herein by reference in their entirety.

TECHNICAL FIELD

The present invention relates to a vehicular air conditioning system, and more particularly, a vehicular air conditioning system in which the movement of water from an outdoor air inlet to an indoor air inlet can be limited to reliably prevent the flow of water from the outdoor air inlet into the indoor air inlet and consequently the flow of water from the outdoor air inlet into the vehicle interior.

BACKGROUND ART

As shown in FIG. 1, a motor vehicle includes an air conditioning system for cooling and heating a vehicle interior. The air conditioning system includes an intake part 10 that sucks an indoor air or an outdoor air and blows it into the vehicle interior.

The intake part 10 is usually installed on the engine room side with respect to a dash panel D. The intake part 10 includes an intake case 12. The intake case 12 is provided with an indoor air inlet 12a and an outdoor air inlet 12b. An intake door 14 is installed between the indoor air inlet 12a and the outdoor air inlet 12b.

The indoor air inlet 12a communicates with the vehicle interior to introduce indoor air, and the outdoor air inlet 12b communicates with the vehicle exterior to introduce outdoor air.

Typically, the indoor air inlet 12a is formed on the side surface portion of the intake case 12 corresponding to the vehicle interior, and the outdoor air inlet 12b is formed on the upper surface portion of the intake case 12 corresponding to the vehicle exterior. Therefore, the outdoor air inlet 12b is located more upward than the indoor air inlet 12a in the gravity direction.

The intake door 14 is a dome-shaped door that rotates between the outdoor air inlet 12b and the indoor air inlet 12a to selectively open the outdoor air inlet 12b or the indoor air inlet 12a.

In particular, the intake door 14 blocks the outdoor air inlet 12b as it moves toward the upper surface portion of the intake case 12, and blocks the indoor air inlet 12a as it moves toward the side surface portion of the intake case 12. Therefore, the indoor air inlet 12a and the outdoor air inlet 12b can be selectively opened to selectively introduce the outdoor air or the indoor air.

In addition, the intake part 10 includes an air filter 20 and a blower 22. The air filter 20 filters foreign substances in the indoor air or the outdoor air introduced through the indoor air inlet 12a or the outdoor air inlet 12b. The blower 22 sucks the indoor air or the outdoor air through the indoor air inlet 12a or the outdoor air inlet 12b, and blows the sucked indoor air or outdoor air toward the vehicle interior.

However, in such a conventional air conditioning system, it is sometimes the case that external water W, for example, rainwater, is introduced to the outdoor air inlet 12b. The water thus introduced may flow into the vehicle interior through the intake door 14 and the inner wall surface of the intake case 12.

In particular, when the intake door 14 is blocking the outdoor air inlet 12b, the water W introduced into the outdoor air inlet 12b remains on the upper surface of the intake door 14 as it is. In this state, if the intake door 14 is rotated toward the indoor air inlet 12a on the side surface portion of the intake case 12, the water accumulated on the upper surface of the intake door 14 flows toward the indoor air inlet 12a and then flows into the vehicle interior.

In addition, around the edge of the intake door 14, as shown in FIGS. 1 and 2, a seal 14a for sealing a gap between the intake door 14 and the intake case 12 is installed. Since the seal 14a is in close contact with the inner wall of the intake case 10, the water W introduced into the outdoor air inlet 12b is not drained into the interior of the intake case 12 and is accumulated on the side surface portion of the intake door 14.

The water W accumulated in this way is infiltrated into the gaps between the seals 14a on both sides of the intake door 14 and the door sealing surfaces 12c and 12d of the intake case 12 corresponding thereto, and is moved toward the indoor air inlet 12a located on the lower side in the direction of gravity. The water W thus moved flows into the vehicle interior through the indoor air inlet 12a.

SUMMARY

In view of the problems inherent in the related art, it is an object of the present invention to provide a vehicular air conditioning system capable of improving the internal structure to prevent the movement of water from an outdoor air inlet to an indoor air inlet.

Another object of the present invention is to provide a vehicular air conditioning system capable of limiting the movement of water from the outdoor air inlet toward the indoor air inlet when the water is introduced into the outdoor air inlet.

A further object of the present invention is to provide a vehicular air conditioning system capable of preventing the water from flowing from the outdoor air inlet into the vehicle interior through the indoor air inlet.

A still further object of the present invention is to provide a vehicular air conditioning system capable of rapidly discharging the water introduced onto the upper surface of an intake door.

A yet still further object of the present invention is to provide a vehicular air conditioning system capable of preventing the water from being accumulated on the upper surface of an intake door.

An even yet still further object of the present invention is to provide a vehicular air conditioning system capable of preventing the water accumulated on the upper surface of an intake door from flowing into the vehicle interior.

In order to achieve these objects, there is provided a vehicular air conditioning system, including: an intake case having an indoor air inlet for introducing an indoor air present in a vehicle interior and an outdoor air inlet for introducing an outdoor air present outside a vehicle; an intake door installed in the intake case to selectively block one of the outdoor air inlet and the indoor air inlet while rotating about a rotation center shaft; and a water blocking part configured to block water flowing into the vehicle interior from the indoor air inlet of the intake case.

In the system, the outdoor air inlet may be located more upward than the indoor air inlet in a gravity direction, and the water blocking part may be configured to prevent the water introduced into the outdoor air inlet from flowing into the vehicle interior while moving toward the indoor air inlet.

In the system, the water blocking part may include a water storage groove formed in a portion of the intake case below the indoor air inlet in a water passage between the outdoor air inlet and the indoor air inlet, and configured to store the water moving from the outdoor air inlet toward the indoor air inlet.

In the system, the water storage groove may be configured to store the water that flows toward a bottom surface of the indoor air inlet when the water accumulated on the upper surface of the intake door flows to the bottom surface of the indoor air inlet during the rotational movement of the intake door.

In the system, an outdoor air inlet side door sealing surface and an indoor air inlet side door sealing surface on which the intake door is seated and sealed may be formed on the inner wall surfaces of the intake case, and the water storage groove may be configured to store the water that flows from the outdoor air inlet toward the indoor air inlet along the outdoor air inlet side door sealing surface and the indoor air inlet side door sealing surface of the intake case.

The system may further include: a drain passage configured to drain the water collected in the water storage groove. The drain passage may include a drain hole formed to extend from a bottom surface of the water storage groove toward the inner lower side of the intake case to drain the water stored in the water storage groove to the inner lower side of the intake case.

According to the vehicular air conditioning system of the present invention, the water moving from the outdoor air inlet to the indoor air inlet is stored and then quickly drained. Therefore, it is possible to limit the movement of water from the outdoor air inlet to the indoor air inlet.

In addition, since the movement of water from the outdoor air inlet to the indoor air inlet can be limited, it is possible to reliably prevent the flow of water from the outdoor air inlet into the indoor air inlet and consequently the flow of water from the outdoor air inlet into the vehicle interior.

DETAILED DESCRIPTION

Figure 1:
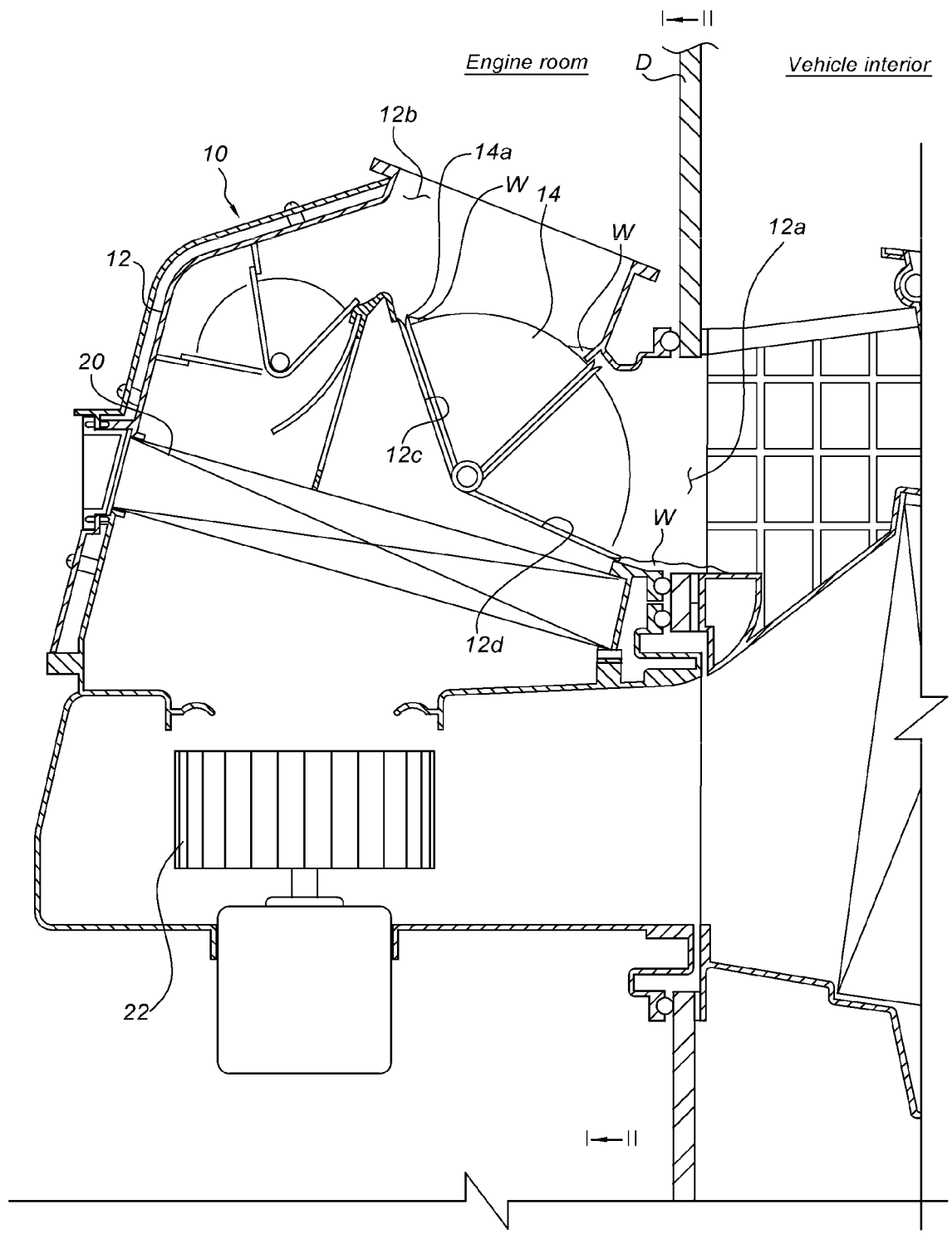
FIG. 1 is a side sectional view showing a conventional vehicular air conditioning system.
Figure 2:
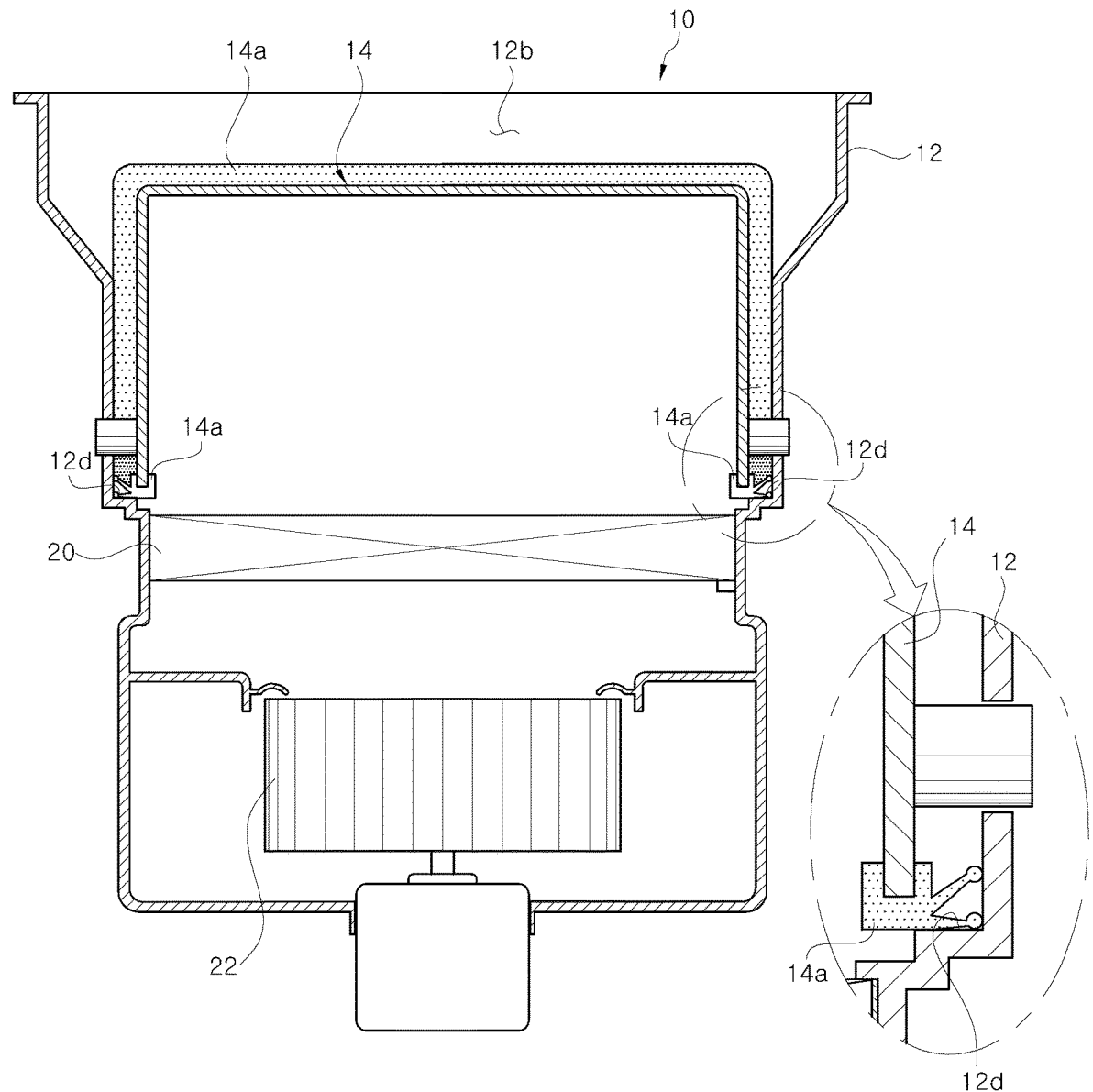
FIG. 2 is a sectional view taken along line II-II in FIG. 1, showing the conventional vehicular air conditioning system.

Preferred embodiments of a vehicular heat management system according to the present invention will now be described in detail with reference to the accompanying drawings.

First Embodiment

Prior to describing the features of the vehicular air conditioning system according to the present invention, the vehicular air conditioning system will be briefly described with reference to FIGS. 3 and 4.

The vehicular air conditioning system includes an intake part 10 that sucks an indoor air or an outdoor air and blows it into the vehicle interior.

The intake part 10 is installed on the engine room side with respect to a dash panel D. The intake part 10 includes an intake case 12. The intake case 12 is provided with an indoor air inlet 12a and an outdoor air inlet 12b. An intake door 14 is installed between the indoor air inlet 12a and the outdoor air inlet 12b.

The indoor air inlet 12a communicates with the vehicle interior to introduce an indoor air, and the outdoor air inlet 12b communicates with the vehicle exterior to introduce an outdoor air.

The indoor air inlet 12a is formed on the side surface portion of the intake case 12 corresponding to the vehicle interior, and the outdoor air inlet 12b is formed on the upper surface portion of the intake case 12 corresponding to the vehicle exterior. Therefore, the outdoor air inlet 12b is located more upward than the indoor air inlet 12a in the gravity direction.

The intake door 14 is a dome-shaped door that rotates between the outdoor air inlet 12b and the indoor air inlet 12a to selectively open the outdoor air inlet 12b or the indoor air inlet 12a.

In particular, the intake door 14 blocks the outdoor air inlet 12b as it moves toward the upper surface portion of the intake case 12, and blocks the indoor air inlet 12a as it moves toward the side surface portion of the intake case 12.

In this regard, the intake door 14 includes side plate portions 16 arranged on both sides and a dome-shaped upper plate portion 18 configured to connect the side plate portions 16.

The side plate portions 16 on both sides have rotation center shafts 16a rotatably fitted into the shaft holes 12e of the intake case 12. The side plate portions 16 on both sides assembled in this way are rotated about the rotation center shafts 16a to rotate the intake door 14.

The upper plate portion 18 directly blocks the outdoor air inlet 12b or the indoor air inlet 12a. In particular, the intake door 14 blocks the outdoor air inlet 12b as it is erected upward, and blocks the indoor air inlet 12a as it lays to the side.

Meanwhile, a seal 14a is provided around the edges of the side plate portions 16 and the upper plate portion 18. The seal 14a is in close contact with the inner wall of the intake case 12. In particular, the seal 14a is in close contact with the door sealing surface 12c on the side of the outdoor air inlet 12b side or the door sealing surface 12d on the side of the outdoor air inlet 12b, which are formed in the intake case 12.

The seal 14a hermetically seals a gap between the intake door 14 and the outdoor air inlet 12b, or a gap between the intake door 14 and the indoor air inlet 12a.

In addition, the intake part 10 includes an air filter 20 and a blower 22. The air filter 20 installed on the downstream side of the intake door 14 to filter foreign substances in the indoor air or the outdoor air introduced through the indoor air inlet 12a or the outdoor air inlet 12b. The blower 22 sucks the indoor air or the outdoor air through the indoor air inlet 12a or the outdoor air inlet 12b, and blows the sucked indoor air or outdoor air toward the vehicle interior.

Next, the features of the vehicular air conditioning system according to the present invention will be described in detail with reference to FIGS. 3 to 5.

First, the vehicular air conditioning system according to the present invention includes a water blocking part 30 capable of blocking water flowing into the vehicle interior from the indoor air inlet 12a of the intake case 12.

The water blocking part 30 includes a water storage groove 32 formed on the bottom surface 12a-1 of the indoor air inlet 12a of the intake case 12 facing the vehicle interior.

The water storage groove 32 is formed along the width direction of the indoor air inlet 12a at a predetermined depth on the water flow path between the outdoor air inlet 12b and the indoor air inlet 12a of the intake case 12 on the bottom surface 12a-1 of the indoor air inlet 12a of the intake case 12.

In particular, the water introduced into the outdoor air inlet 12b flows toward the bottom surface 12a-1 of the indoor air inlet 12a through the upper surface of the intake door 14 and the door sealing surfaces 12c and 12d of the intake case 12 and then flows into the vehicle interior. The water storage groove 32 is formed on the water flow path extending from the outdoor air inlet 12b to the indoor air inlet 12a.

Since the water storage groove 32 is formed on the bottom surface 12a-1 of the indoor air inlet 12a, the water storage groove 32 serves to store the water W moved from the outdoor air inlet 12b to the indoor air inlet 12a through the upper surface of the intake door 14 and the door sealing surfaces 12c and 12d of the intake case 12.

In particular, when the water introduced into the outdoor air inlet 12b is accumulated on the upper surface of the intake door 14, the water W is poured onto the bottom surface 12a-1 of the indoor air inlet 12a during the rotational movement of the intake door 14. The water storage groove 32 stores the water W poured into the indoor air inlet 12a.

In addition, the water introduced into the outdoor air inlet 12b flows into the vehicle interior while moving toward the indoor air inlet 12a through the door sealing surfaces 12c and 12d of the intake case 12. The water storage groove 32 stores the water W moving from the door sealing surfaces 12c and 12d to the indoor air inlet 12a.

Therefore, it is possible to prevent the movement of the water from the outdoor air inlet 12b to the indoor air inlet 12a, thereby preventing the water from flowing from the outdoor air inlet 12b into the vehicle interior.

Referring again to FIGS. 3 to 5, the water blocking part 30 further includes a drain passage 40 capable of draining the water W collected in the water storage groove 32.

The drain passage 40 includes a drain hole 42 formed on the bottom surface 32a of the water storage groove 32. The drain hole 42 is formed to extend from the bottom surface 32a of the water storage groove 32 toward the inner lower side of the intake case 12. The drain hole 42 drains the water W collected in the water storage groove 32 into the intake case 12. In particular, the water W is drained downward along the inner wall surface of the intake case 12.

Accordingly, the water W drained to the lower portion of the intake case 12 is allowed to flow into the inner passage 12f of the intake case 12, and can move to an evaporator condensate drain hole (not shown) on the downstream side of the inner passage 12f. As a result, the water W can be discharged to the outside through the evaporator condensate drain hole.

Meanwhile, the drain hole 42 is formed on the bottom surface 32a of the water storage groove 32, and is preferably formed in a part of the bottom surface 32a of the water storage groove 32. In some cases, a plurality of drain holes 42 may be formed at intervals on the bottom surface 32a of the water storage groove 32.

In this regard, the bottom surface 32a of the water storage groove 32 is inclined downward toward the drain hole 42. Therefore, the water W stored in the water storage groove 32 can be quickly drained to the drain hole 42.

In addition, the drain hole 42 is preferably formed to extend from the bottom surface 32a of the water storage groove 32 toward the inner lower side of the intake case 12 so that the end portion 42a of the drain hole 42 faces the lateral edge of the air filter 20 on the downstream side thereof.

More preferably, the end portion 42a of the drain hole 42 is formed to face the edge band 20a of the air filter 20. In particular, the end portion 42a of the drain hole 42 extends toward the underside of the band 20a of the air filter 20 so as to be covered by the band 20a of the air filter 20.

The reason for adopting this configuration is to ensure that the water W drained from the water storage groove 32 does not flow into the inner filter portion 20b of the air filter 20, and does not obstruct the flow of an air sucked into the inner filter portion 20b of the air filter 20.

In particular, the water W drained from the water storage groove 32 may be scattered by the wind pressure of the air sucked into the inner filter portion 20b of the air filter 20. The above configuration can prevent such scattering of the water.

Referring again to FIGS. 3 to 5, the water blocking part 30 further includes a water blocking wall 50 formed in the intake case 12 between the water storage groove 32 and the indoor air inlet 12a.

The water blocking wall 50 protrudes from the bottom surface 12a-1 on the side of the indoor air inlet 12a to the indoor air inlet 12a, and is formed long along the width direction of the indoor air inlet 12a.

Figure 3:
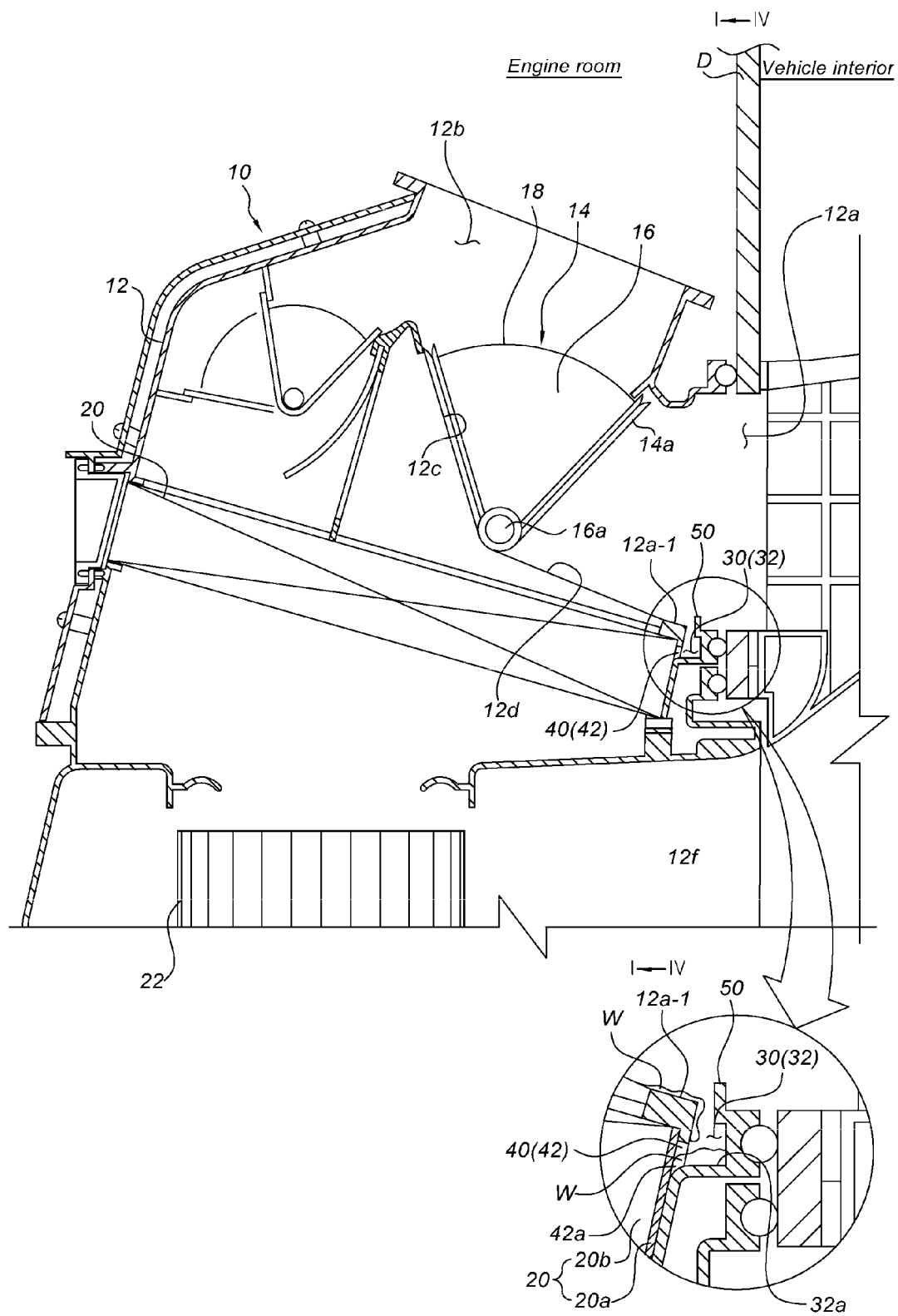
FIG. 3 is a side sectional view showing a vehicular air conditioning system according to a first embodiment of the present invention.
Figure 4:
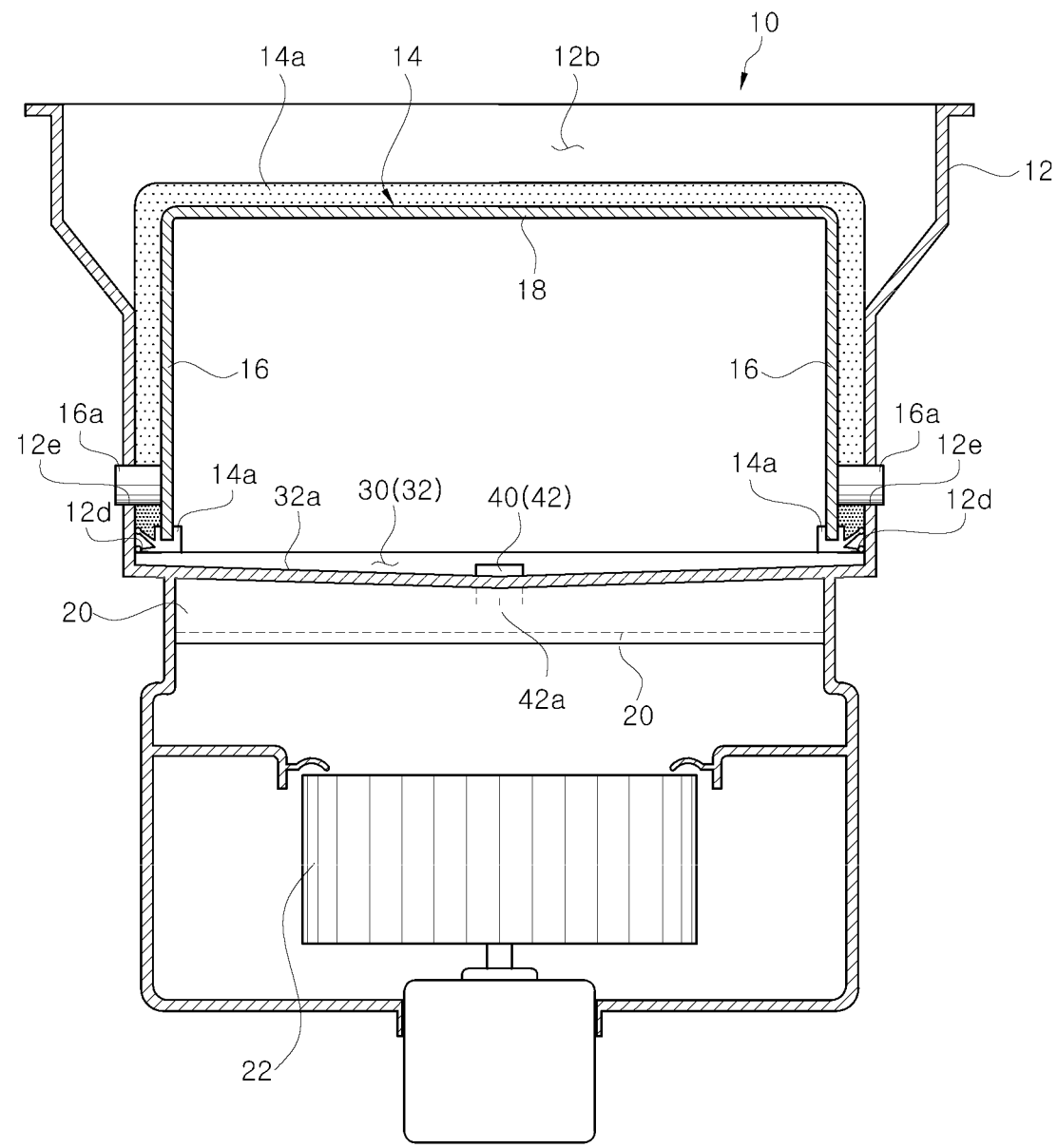
FIG. 4 is a sectional view taken along line IV-IV in FIG. 3, showing the vehicular air conditioning system according to the first embodiment of the present invention.
Figure 5:
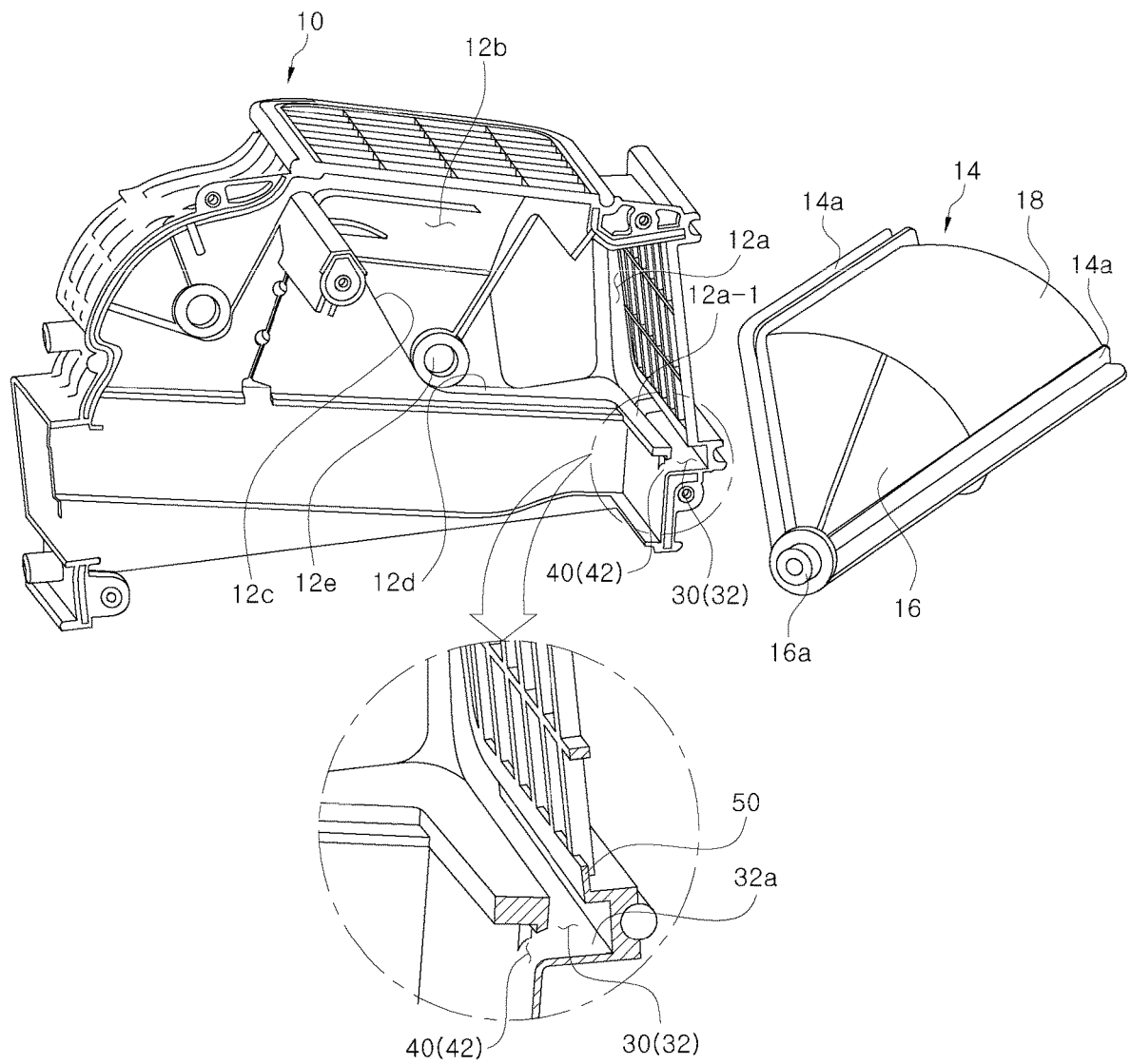
FIG. 5 is a perspective view showing main features of the vehicular air conditioning system according to the first embodiment of the present invention.

As shown in FIGS. 3 and 5, the water blocking wall 50 serves to secondarily block the water W introduced from the outdoor air inlet 12b toward the indoor air inlet 12a through the water storage groove 32.

Therefore, when excessive water W is introduced from the outdoor air inlet 12b or when the motor vehicle is excessively tilted downward toward the rear side, the water blocking wall 50 secondarily blocks the water flowing into the indoor air inlet 12a through the water storage groove 32. As a result, it is possible to reliably prevent the water W from flowing from the indoor air inlet 12a toward the vehicle interior.

Meanwhile, the water blocking wall 50 protrudes from the bottom surface 12a-1 on the side of the indoor air inlet 12a toward the indoor air inlet 12a and has a structure and height so as not to impede the flow of an air introduced from the vehicle interior to the indoor air inlet 12a.

According to the air conditioner of the first embodiment having such a configuration, the water W moving from the outdoor air inlet 12*b* toward the indoor air inlet 12*a* is stored and then quickly drained. Therefore, it is possible to limit the movement of the water W from the outdoor air inlet 12*b* toward the indoor air inlet 12*a*.

In addition, since the movement of water from the outdoor air inlet 12*b* to the indoor air inlet 12*a* can be limited, it is possible to reliably prevent the flow of water W from the outdoor air inlet 12*b* into the indoor air inlet 12*a* and consequently the flow of water W from the outdoor air inlet 12*b* into the vehicle interior.

Second Embodiment

Figure 6:
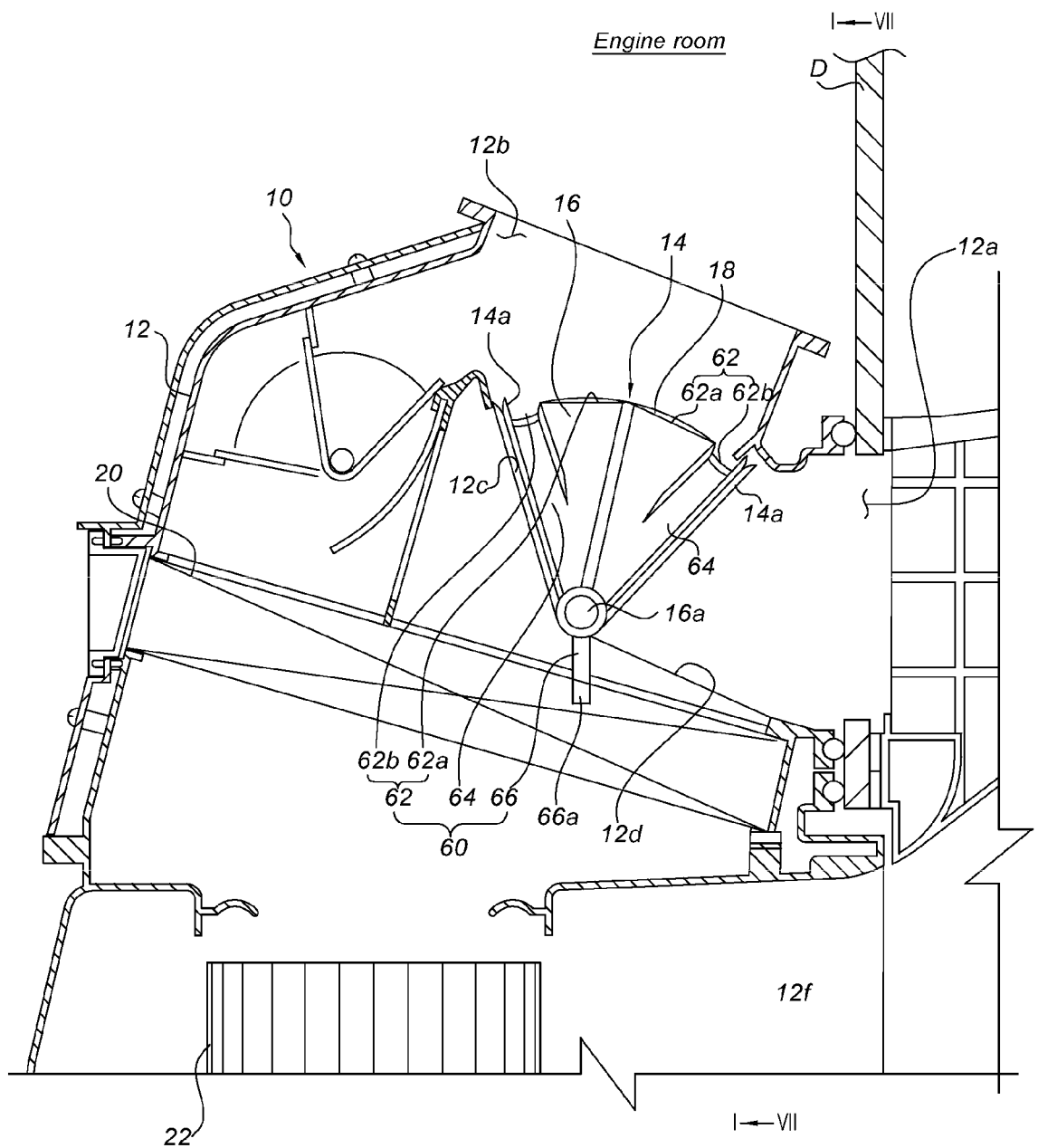
FIG. 6 is a side sectional view showing a vehicular air conditioning system according to a second embodiment of the present invention.
Figure 7:
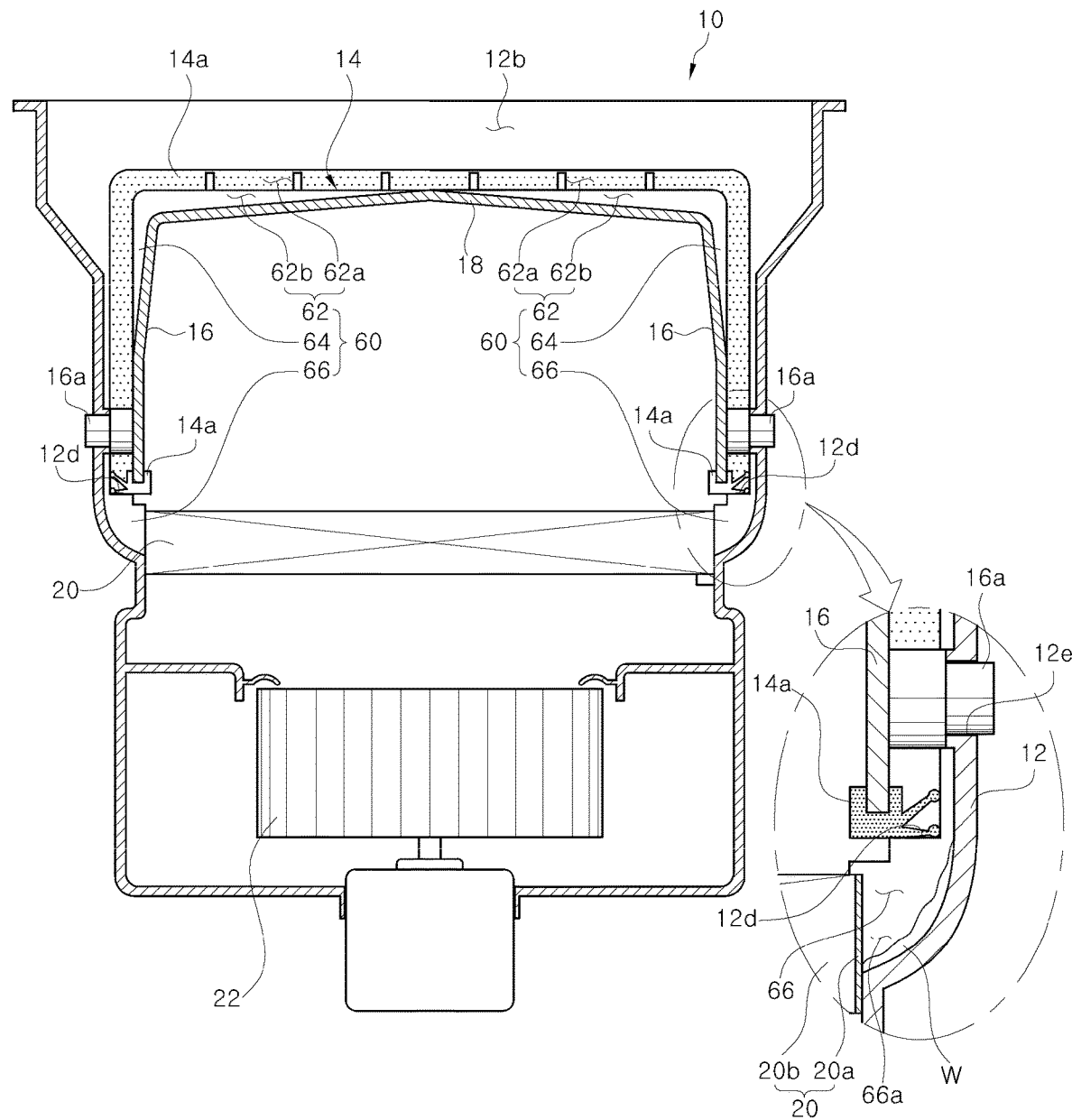
FIG. 7 is a sectional view taken along line VII-VII in FIG. 6, showing the vehicular air conditioning system according to the second embodiment of the present invention.
Figure 8:
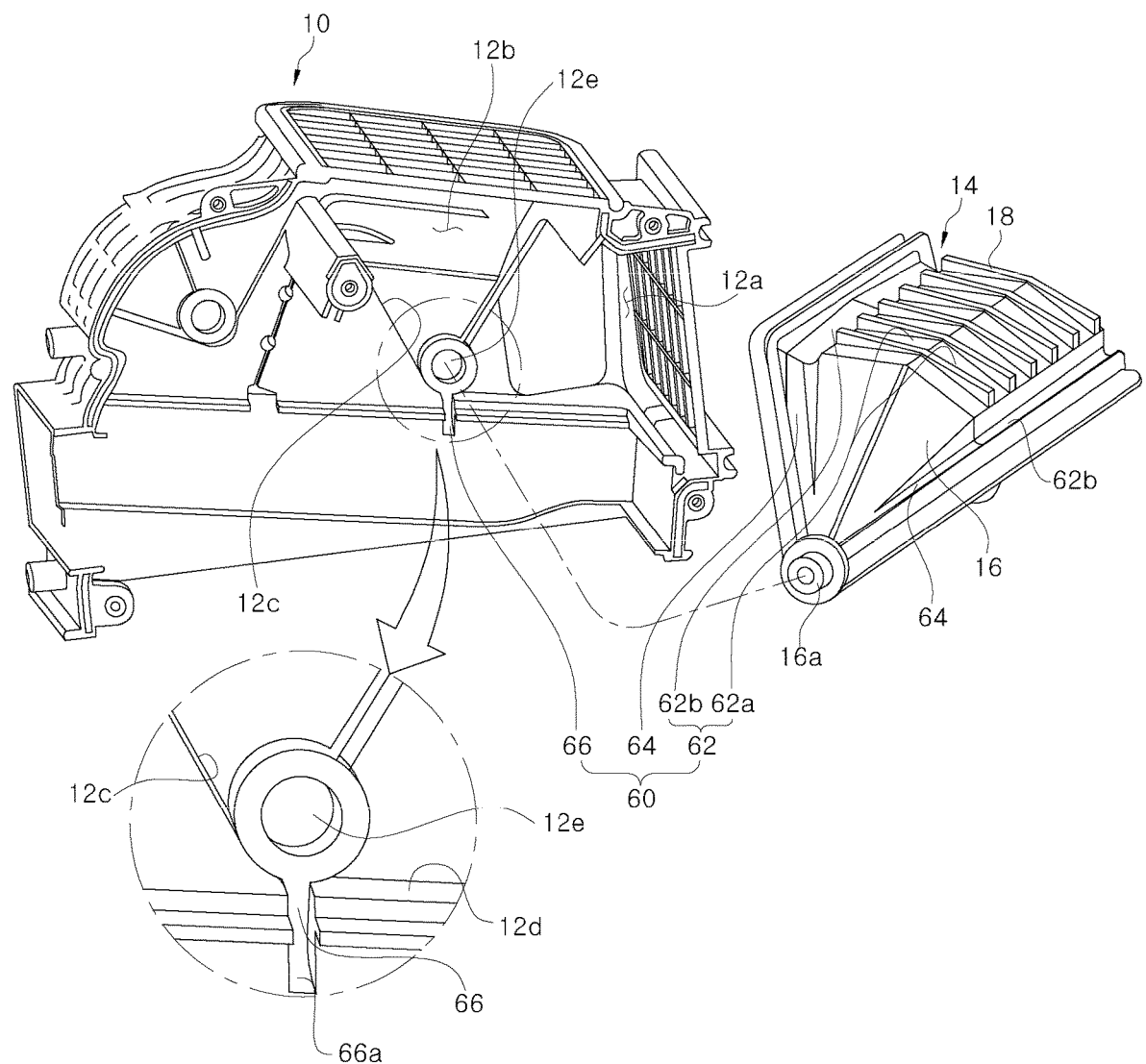
FIG. 8 is a perspective view showing the main features of the vehicular air conditioning system according to the second embodiment of the present invention.

Next, a vehicular air conditioning system according to a second embodiment of the present invention will be described with reference to FIGS. 6 to 8.

The vehicular air conditioning system according to the second embodiment includes a drain part 60 capable of draining water introduced onto the upper surface of the intake door 14 to the lower side of the intake case 12.

The drain part 60 includes first drain passages 62 for draining the water flowing onto the upper plate portion 18 of the intake door 14 toward the side plate portions 16, second drain passages 64 for draining the water drained toward the rotation center shafts 16*a* of the side plate portions 16, and third drain passages 66 for draining the water drained to the rotation center shafts 16*a* toward the inner wall portions of the intake case 12.

The first drain passages 62 include a plurality of water collection grooves 62*a* for collecting the water introduced into the dome-shaped upper plate portion 18 of the intake door 14 toward both ends of the intake door 14 in the rotational direction, and drain grooves for draining the water collected at both ends of the upper plate portion 18 toward the left and right side plate portions 16, respectively.

The water collection grooves 62*a* are formed to be inclined downward at a predetermined angle from the central portion of the upper plate portion 18 in the rotational direction toward the front and rear ends of the upper plate portion 18 in the rotational direction. The water collection grooves 62*a* formed in this way collect the water introduced onto the upper plate portion 18 to the front and rear ends of the upper plate portion 18, respectively.

The drain grooves 62*b* are formed at the front and rear ends of the upper plate portion 18 in the rotational direction, respectively, and are formed to be inclined downward at a predetermined angle from the central portion of the upper plate portion 18 in the left-right direction toward the side plate portions 18. The drain grooves 62*b* formed in this way drain the water collected at the front and rear ends of the upper plate portion 18 toward the side plate portions 16, respectively.

The second drain passages 64 are formed to extend from the drain grooves 62*b* of the upper plate portion 18 toward the rotation center shafts 16*a* of the side plate portions 16. The second drain passages 64 thus formed drain the water on the side of the drain grooves 62*b* toward the rotation center shafts 16*a* of the side plate portions 16.

The third drain passages 66 are formed on the inner wall portions of the intake case 12 corresponding to the rotation center shafts 16*a* of the side plate portions 16. In particular, the third drain passages 66 are formed on the inner wall portions of the intake case 12 corresponding to the rotation center shafts 16*a* corresponding to the lower portions of the rotation center shafts 16*a*. The end portions 66*a* of the third drain passages 66 are formed to face the lower side of the intake case 12.

The third drain passages 66 drain the water W in the rotation center shafts 16*a* of the intake door 14 along the inner wall surfaces of the intake case 12. In particular, the third drain passages 66 drain the water W to the lower portion of the intake case 12 along the inner wall surfaces of the intake case 12.

Accordingly, the water W drained to the lower portion of the intake case 12 can flow into the inner passage 12*f* of the intake case 12, and can move to the evaporator condensate drain hole (not shown) on the downstream side of the inner passage 12*f*. As a result, the water W can be discharged to the outside through the evaporator condensate drain hole.

Meanwhile, it is preferable that the third drain passages 66 are formed downward from the inner wall surfaces of the intake case 12 on the side of the rotation center shafts 16*a* of the intake door 14, and the end portions 66*a* of the third drain passages 66 are formed to face the side edges of the air filter 20 on the downstream side thereof.

More preferably, the end portions 66*a* of the third drain passages 66 are formed to face the edge band 20*a* of the air filter 20. In particular, the end portions 66*a* of the third drain passages 66 extend toward the underside of the bands 20*a* of the air filter 20 so as to be covered by the bands 20*a* of the air filter 20.

The reason for adopting this configuration is to ensure that the water W drained to the rotation center shafts 16*a* of the intake door 14 does not flow into the inner filter portion 20*b* of the air filter 20 and does not disturb the flow of an air sucked into the inner filter portion 20*b* of the air filter 20.

In particular, the water drained to the rotation center shafts 16*a* of the intake door 14 may be scattered by the wind pressure of the air sucked into the inner filter portion 20*b* of the air filter 20. The above configuration can prevent the scattering of water.

In addition, the third drain passages 66 are formed downward on the inner wall surfaces of the intake case 12 on the side of the rotation center shafts 16*a* of the intake door 14. As shown in FIGS. 3 and 5, the third drain passages 66 are formed between the door sealing surface 12*c* on the side of the outdoor air inlet 12*b* and the door sealing surface 12*d* on the side of the indoor air inlet 12*a*, which are formed in the intake case 12.

In particular, the door sealing surface 12*c* on the side of the outdoor air inlet 12*b* and the door sealing surface 12*d* on the side of the indoor air inlet 12*a* of the intake case 12 are formed to correspond to each other on the inner wall surfaces of the intake case 12 with respect to the rotation center shafts 16*a* of the intake door 14. At this time, the third drain passages 66 are formed to isolate the door sealing surface 12*c* on the side of the outdoor air inlet 12*b* and the sealing surface 12*d* on the side of the indoor air inlet 12*a* from each other.

The reason for adopting this configuration is to prevent the water introduced onto the upper surface of the intake door 14 from flowing toward the door sealing surface 12*d* on the side of the indoor air inlet 12*a* while moving along the door sealing surface 12*c* on the side of the outdoor air inlet 12*b*.

Therefore, it is possible to prevent the water introduced onto the upper surface of the intake door 14 from flowing into the vehicle interior along the door sealing surface 12*c* on the side of the outdoor air inlet 12*b* and the sealing surface 12*d* on the side of the indoor air inlet 12*a* of the intake case 12.

According to the vehicular air conditioning system of the present invention having such a configuration, the water introduced onto the upper surface of the intake door 14 can be guided toward both inner wall surfaces of the intake case 12 and can be quickly drained downward. Therefore, it is possible to prevent water from being accumulated on the upper surface of the intake door 14.

In addition, since the accumulation of water on the upper surface of the intake door 14 can be prevented, it is possible to prevent the water accumulated on the upper surface of the intake door 14 from flowing into the vehicle interior.

While the preferred embodiments of the present invention have been described above, the present invention is not limited to the above-described embodiments. Various modifications and changes may be made without departing from the scope and spirit of the present invention defined in the claims.

For example, it is shown in the drawings that the water blocking part 30 of the first embodiment and the drain part 60 of the second embodiment are independently installed in the intake part 10 of the vehicular air conditioning system. However, the present invention is not limited thereto. The water blocking part 30 of the first embodiment and the drain part 60 of the second embodiment may be simultaneously installed in the intake part 10 of the vehicular air conditioning system.

What is claimed is:

1. A vehicular air conditioning system, comprising:
   an intake case having an indoor air inlet for introducing indoor air present in a vehicle interior and an outdoor air inlet for introducing outdoor air present outside a vehicle;
   an intake door installed in the intake case to selectively block one of the outdoor air inlet and the indoor air inlet while rotating about a rotation center shaft; and
   a water blocking part configured to block water flowing into the vehicle interior from the indoor air inlet of the intake case,
   wherein the outdoor air inlet is located more upward than the indoor air inlet in a gravity direction, and
   wherein the water blocking part includes a water storage groove formed in a portion of the intake case below the indoor air inlet in a water passage between the outdoor air inlet and the indoor air inlet, and configured to store the water moving from the outdoor air inlet toward the indoor air inlet.

2. The system of claim 1, wherein the water storage groove is configured to store the water that flows toward a bottom surface of the indoor air inlet when the water accumulated on the upper surface of the intake door flows to the bottom surface of the indoor air inlet during the rotational movement of the intake door.

3. The system of claim 2, wherein an outdoor air inlet side door sealing surface and an indoor air inlet side door sealing surface on which the intake door is seated and sealed are formed on an inner wall surface of the intake case, and the water storage groove is configured to store the water that flows from the outdoor air inlet toward the indoor air inlet along the outdoor air inlet side door sealing surface and the indoor air inlet side door sealing surface of the intake case.

4. The system of claim 3, further comprising:
   a drain passage configured to drain the water collected in the water storage groove.

5. The system of claim 4, wherein the drain passage includes a drain hole formed to extend from a bottom surface of the water storage groove toward an inner lower side of the intake case to drain the water stored in the water storage groove to the inner lower side of the intake case.

6. The system of claim 5, wherein an air filter is installed on the downstream side of the intake door, and the drain hole has an end portion formed to face a side edge of the air filter on the downstream side thereof.

7. The system of claim 6, wherein the end portion of the drain hole extends toward a lower side of a band of the air filter so as to be covered by the band of the air filter.

8. The system of claim 3, wherein the water storage groove has a bottom surface inclined downward toward a drain hole.

9. The system of claim 3, further comprising:
   a water blocking wall formed in a portion of the intake case between the water storage groove and the indoor air inlet,
   wherein the water blocking wall protrudes from a bottom surface below the indoor air inlet toward the indoor air inlet to secondarily block the water flowing toward the indoor air inlet through the water storage groove.

10. A vehicular air conditioning system, comprising:
    an intake case having an indoor air inlet for introducing indoor air present in a vehicle interior and an outdoor air inlet for introducing outdoor air present outside a vehicle;
    an intake door installed in the intake case to selectively block one of the outdoor air inlet and the indoor air inlet while rotating about a rotation center shaft;
    a water blocking part configured to block water flowing into the vehicle interior from the indoor air inlet of the intake case; and
    a drain part configured to guide the water introduced onto an upper surface of the intake door through the outdoor air inlet toward an inner wall of the intake case and drain the water downward,
    wherein the outdoor air inlet is located more upward than the indoor air inlet in a gravity direction, and
    wherein the intake door includes side plate portions configured to rotate about the rotation center shaft between the outdoor air inlet and the indoor air inlet, and a dome-shaped upper plate portion configured to block the outdoor air inlet when the side plate portions move toward the outdoor air inlet, and configured to block the indoor air inlet when the side plate portions move toward the indoor air inlet.

11. The system of claim 10, wherein the drain part includes first drain passages for draining the water flowing onto the upper plate portion of the intake door toward the side plate portions, second drain passages for draining the water from the side plate portions toward the rotation center shaft of the side plate portions, and third drain passages for draining the water from the side plate portions toward the inner wall of the intake case.

12. The system of claim 11, wherein the first drain passages include a plurality of water collection grooves for collecting the water introduced into the upper plate portion of the intake door toward front and rear ends of the intake door in the rotational direction, and drain grooves for draining the water collected at the front and rear ends of the upper plate portion toward the side plate portions.

13. The system of claim 12, wherein the plurality of water collection grooves are formed to be inclined downward at a predetermined angle from a central portion of the upper plate portion in the rotational direction toward the front and rear ends of the upper plate portion in the rotational direction and configured to collect the water introduced onto the upper plate portion to the front and rear ends of the upper plate portion, and the drain grooves are formed at the front and rear ends of the upper plate portion in the rotational direction and formed to be inclined downward at a predetermined angle from the central portion of the upper plate portion in the left-right direction toward the side plate portions to drain the water collected at the front and rear ends of the upper plate portion toward the side plate portions.

14. The system of claim 13, wherein the second drain passages are formed to extend from the drain grooves of the upper plate portion toward the rotation center shafts of the side plate portions and configured to drain the water on side surfaces of the drain grooves toward the rotation center shafts of the side plate portions.

15. The system of claim 14, wherein the third drain passages are formed on the inner wall portions of the intake case corresponding to the rotation center shafts of the side plate portions to drain the water from the rotation center shafts of the side plate portions to the inner wall surfaces of the intake case.

16. The system of claim 15, wherein the third drain passages are formed on the inner wall portions of the intake case corresponding to lower portions of the rotation center shafts, and the third drain passages have end portions formed to face a lower side of the intake case to drain the water downward from the rotation center shafts of the intake door along the inner wall surfaces of the intake case.

17. The system of claim 16, wherein an air filter is installed on the downstream side of the intake door, and the end portions of the third drain passages are formed to face a side edge of the air filter.

18. The system of claim 17, wherein the end portions of the third drain passages extend to below a band of the air filter so as to be covered by the band of the air filter.

19. The system of claim 11, wherein an outdoor air inlet side door sealing surface and an indoor air inlet side door sealing surface are formed on the inner wall surfaces of the intake case, the intake door is configured to block the outdoor air inlet or the indoor air inlet while being seated on the outdoor air inlet side door sealing surface or the indoor air inlet side door sealing surface of the intake case, and the third drain passages are formed on inner wall surfaces of the intake case corresponding to the rotation center shafts of the intake door so as to isolate the outdoor air inlet side door sealing surface and the indoor air inlet side door sealing surface from each other to prevent movement of the water from the outdoor air inlet side door sealing surface toward the indoor air inlet side door sealing surface.

* * * * *